Oct. 25, 1955   G. H. PERRYMAN   2,721,600
METHOD OF MAKING TABLE TENNIS BALLS
Filed May 13, 1954
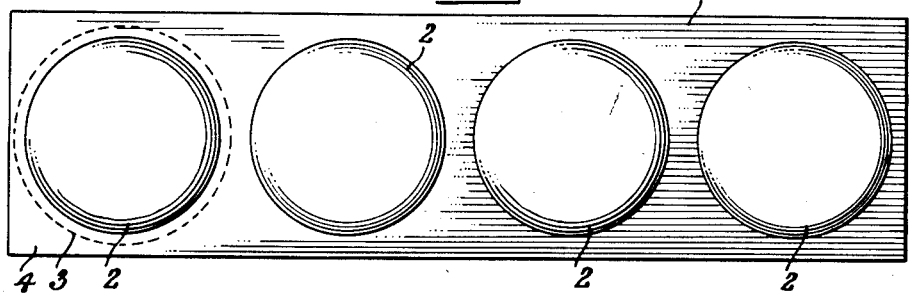
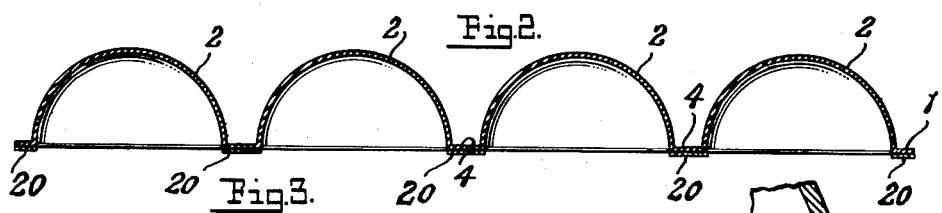
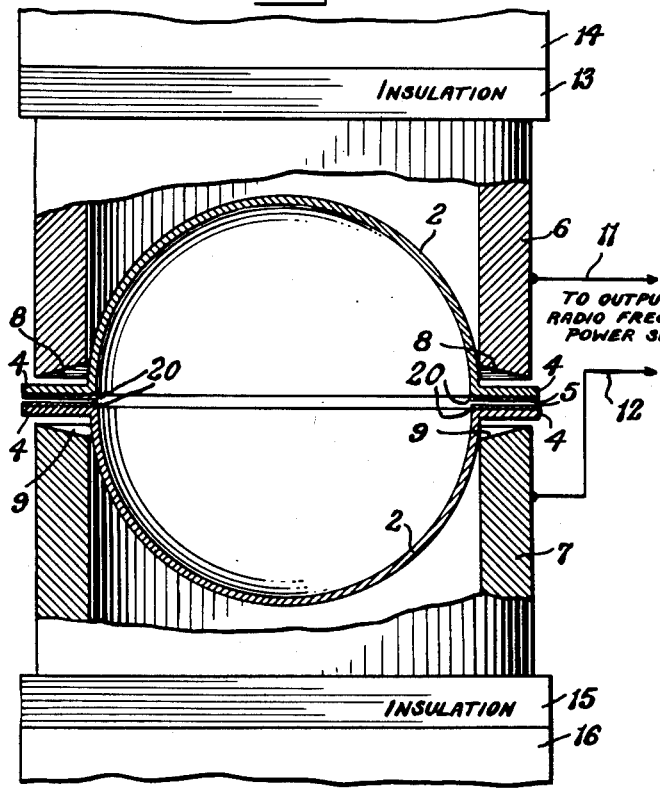
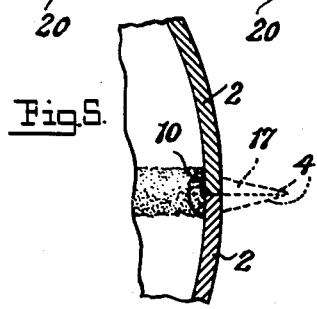
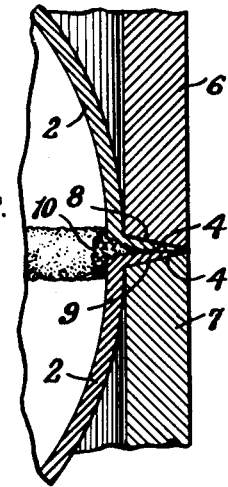
INVENTOR.
George H. Perryman
BY
Harry Radzinsky
Attorney.

United States Patent Office 2,721,600
Patented Oct. 25, 1955

2,721,600

METHOD OF MAKING TABLE TENNIS BALLS

George H. Perryman, Teaneck, N. J., assignor to Windsor Mfg. Co. of Clifton, New Jersey, Clifton, N. J., a firm Application May 13, 1954, Serial No. 429,467

2 Claims. (Cl. 154—16)

This invention relates to means and methods for making table tennis balls and similar hollow objects such as are made from thermo-plastic sheet material such as the highly-inflammable material like nitro-cellulose. The invention has for its object the provision of means by which improved balls can be speedily and economically manufactured.

As is well known, the conventional table tennis ball as presently manufactured is composed of two halves or hemispheres which have their edges telescoped or overlapped to form a joint between them, said overlapped parts being adhesively united by the use of a solvent. This tends to produce an encircling "band" of double thickness around the ball which upon drying of the solvent sometimes acts to destroy the perfect globular contour and balance of the ball.

It is the primary object of the present invention to provide a ball in which these overlapped parts of the ball are eliminated, and a butt joint of exceptional strength is provided through a seam of scarcely-perceptible nature.

In my Patent No. 2,378,034, I have disclosed a means by which table tennis balls may be made by placing ball halves together with solvent-softened flanged portions of the halves in contact, and by the application of pressure imposed on said flanges by angular-surfaced, unheated sealing dies, solvent-softened portions of the flanges are displaced inwardly toward the interior of the ball to build up and form a bridge over the joint on the inside of the ball and result in a strong butt joint.

I have found that it is possible to produce a very strong joint between the ball halves by the use of a certain type of solvent combined with the application of heat of a nature which will fuse together the contacting edge portions in a novel manner to result in the production of an extremely satisfactory and scarcely noticeable joint. The present invention therefore comprehends means by which the halves of the ball may be fused together by the use of a flux composed of a certain type of solvent and an electronic source of power, and the flow of the fusible portions of the ball halves so directed that the most advantageous placement of such material results to produce a strong joint between the ball halves.

In the accompanying drawing, forming a part hereof,

Fig. 1 is a plan view of a strip of sheet material in which four ball halves have been formed;

Fig. 2 is a longitudinal sectional view through the sheet, showing the flux applied thereto;

Fig. 3 is a sectional view through the sealing dies, which are also the electrodes of an ultra-high frequency power source, and showing two ball halves in readiness to be brought together and united by operation of the dies and heat generated in the ball parts;

Fig. 4 is a sectional view through portions of the dies or electrodes, and parts of the ball, showing the operation of making the seal or joint between the ball halves; and Fig. 5 is a sectional view through a part of the finished ball.

Table tennis balls are usually made from the highly-inflammable material known as nitro-cellulose, often known under the trade name of "Celluloid," or from cellulose acetate or similar thermo-plastic sheet material. In carrying out the method of the present invention, I first form a number of the ball halves in a strip or sheet of the material while the material is made relatively soft by a light application of heat. In Figs. 1 and 2 are shown four ball halves 2, pressed from the strip 1 by the action of a suitable die. To simultaneously make four balls, two of these strips are used, the strips being placed with the concave faces of the ball halves facing toward one another, and with the flange portions 4 between the ball halves in contact. Of course, a single ball may be made at a time, and in such a case each ball half is cut from the strip 1 along the dotted line 3, and two of such halves are then placed together with their respective radially projecting flanges in contact and joined together as hereafter described.

In producing a number of the balls at a time, the halves of the several balls are placed together with the faces 5 of the flanges 4 in contact, and then by the action of pressure and heat generated electrostatically by the application of high frequency, the opposing surfaces of the material between the electrodes is heated to the melting point, the material flows and these flanges and adjacent parts of the ball halves are fused together.

In Fig. 3 a pair of dies is shown for effecting this result. These dies, which are also the electrodes of the electrostatic heating apparatus, are respectively indicated at 6 and 7, and are of similar annular form and thus fit closely around the ball halves, so that when the dies are brought toward one another they will accurately align the ball halves, and the ball produced will thus be perfectly spherical. The operative faces of the dies are inclined, as indicated at 8 on the die 6, and at 9 on the die 7, for a purpose to be hereafter explained. Each die is electrically insulated from its carrying head. The insulation for the die 6 is shown at 13, said die being carried from the head 14. Similarly, the die 7 is insulated at 15 from its head 16. An electrical connection or lead 11 extends from the die 6, and a similar connection or lead 12 extends from the die 7, these connections extending to the output of a radio frequency power supply unit, so that the two dies 6 and 7 constitute electrodes through which heat is electrostatically generated in the portions of the ball-half flanges 4 which are located and compressed between the die-electrodes 6 and 7.

The radio frequency power supply unit may be a high frequency oscillator having a frequency of from ten million to approximately forty million cycles. This will provide high frequency at low voltage at the electrodes 6 and 7, this latter feature being of importance since it renders such a unit entirely safe for operation upon highly inflammable materials such as nitro-cellulose. Through an arrangement, as above described, electrostatically-generated heat in the flanges 4 of the ball halves will cause the flanges, and particularly these portions of the same situated at and adjacent to the faces 5, to become soft and fusible, and thus become welded or fused together. A phenomenon of this type of electrostatically-generated heat is the ability of the same to generate its highest temperature centrally between the electrodes, or in other words at the point of contact of the two surfaces 5, so that when temperature of the required degree is reached, the breakdown or melting of the material at and adjacent to the faces 5 of the flanges takes place. Since this occurs while the abutting flanges 4 are being compressed between the angular surfaces 8 and 9 of the electrodes 6 and 7, the result of this heat and application of pressure between these angular surfaces, is to cause the softened parts of the flanges 4 to be displaced inwardly or toward the inside of the ball, as indicated at 10 in Figs. 4 and 5. This inwardly-displaced fused or melted material 10 builds up over and adjacent to the joint between the ball halves and fuses the ball halves together. Thus, when the parts become cooled and hardened, a strong fused joint between the ball halves is the result. Thereafter, the projecting flange parts, indicated in dotted lines at 17 in Fig. 5, are trimmed away and the ball is thereafter given the customary finishing treatments, resulting in a ball having an almost invisible seam or joint. The temperature of the material rendered molten by the electronic energy produced in the parts 8 and 9 of the heating dies is critical since it is necessary that this temperature be sufficiently high to render molten the flange portions 4 of the ball halves without the possibility of the ball halves bursting into flame. Since there is very close range between the temperature required to render the material molten and that which will set the material aflame, close control of the temperature is desirable.

Before placing the flanged parts 4 of the ball halves together and in contact, it is desirable and necessary to apply to the contacting faces 5 thereof a light or thin coating of a material or chemical 20 (Fig. 3), tending to break down surface tension of the material of these faces when they become molten and to prevent oxidation, and to act as a flux to facilitate the fusing of the heat-softened material of the flanges. Such a flux or solvent must be one which has certain definite characteristics. That is to say, it must be slow acting, since its purpose is not to materially soften the meeting faces of the flanged parts 4, but rather to de-oxidize or destroy the film which normally appears on nitro-cellulose when rendered molten by heat. It is to be noted that the solvent is not employed as a joining agent, but rather as a means by which integral fusion of the two contiguous flanges occur when subjected to the electronic heating heretofore described, and which fusion might be prevented without the use of a flux such as described.

In addition to being a slow-acting solvent, the flux employed must be one having a relatively high boiling point, or of low inflammability. For example, the solvent sold under the trade name "Cellusolve" sold by Carbide & Carbon Chemicals Corporation, of New York city, is satisfactory since such product has a boiling point of 144.5° C. Such material is a compound of ethylene glycol monomethyl ether. Such a preparation as methyl amyl acetate, and numerous others can also be successfully used.

In applying the flux or solvent to the flanged parts 4 of the two strips to be placed together, a pad or sponge saturated with the solvent is used and the strips are lightly passed over it to thereby receive a thin coating or film of the solvent. Since the solvent is not employed as an adhesive nor for the purpose of materially softening the meeting faces of the two strips which are placed together, the two strips in the relationship shown in Fig. 3 may be placed between the heating dies immediately after the application of the solvent, and the heat applied as above described. There is therefore no time required for setting of the solvent and hence the method of making the balls is a continuous one.

It is a notable characteristic of radio frequency heat generators of the character described to maintain their electrodes at low temperature while heat of high temperature is being generated in the opposed faces of the dielectric material situated between the electrodes.

From the foregoing, it will be apparent that by the method and apparatus described, table tennis balls of a high standard of construction may be speedily and economically manufactured. The fusing together of the halves of the ball by the use of a first-applied flux and then electrostatically generated heat, permits control of the heat in selected areas so that distortion of the ball due to thickening of the walls of the same in areas wherein such thickening might be undesirable, is obviated. While the joint produced between the two ball halves is a butt joint, the fusion of the parts is such that the joint is an exceedingly strong one, and one which has no material effect upon the balance of the ball so produced.

What I claim is:

1. The method of making table tennis and similar hollow balls from a highly-combustible material having a fusion temperature close to its ignition point such as nitro-cellulose consisting in the steps of applying a coat of flux to the opposed flanges of cold, hardened ball halves, applying pressure on the flanges only and fusing said flux-bearing flanges together by the application of electrostatically-generated heat applied internally to the flanges at temperatures just below the ignition temperature of said material, whereby joinder between the ball halves occurs while the ball halves remain unheated, hardened and set.

2. The method of making table tennis and similar hollow balls from a highly-combustible material having a fusion temperature close to its ignition point such as nitro-cellulose, consisting in applying a thin film of a coat of flux to flanges on a pair of ball halves, placing the halves together in mating relation with their flux-coated faces in contiguous postion, placing the ball halves between co-axially disposed tubular electrodes which contact the flanges at their outer edges first and squeezing them inwardly, charging the electrodes with high frequency current to provide fusing temperature at the zone of contact between the flanges and applying pressure of said electrodes on the flanges to render said flanges molten internally and causing some of the molten material thereof to be squeezed inwardly to form a circumferential bead on the interior of the ball and which bead bridges the joint between the ball halves and joins the same together.

References Cited in the file of this patent

UNITED STATES PATENTS

| | | |
|---|---|---|
| 1,531,505 | Roberts | Mar. 31, 1925 |
| 2,378,034 | Perryman | June 12, 1945 |
| 2,516,552 | Clark et al. | July 25, 1950 |

FOREIGN PATENTS

| | | |
|---|---|---|
| 550,054 | Great Britain | Aug. 3, 1943 |